United States Patent [19]

Sautter, Jr.

[11] Patent Number: 4,529,158
[45] Date of Patent: Jul. 16, 1985

[54] ADJUSTABLE VEHICLE SEAT MECHANISM

[75] Inventor: Robert H. Sautter, Jr., Spring Arbor, Mich.

[73] Assignee: ITT Corporation, New York, N.Y.

[21] Appl. No.: 494,939

[22] Filed: May 16, 1983

[51] Int. Cl.³ .......................................... A47D 19/04
[52] U.S. Cl. .................................. 248/393; 248/397; 248/429; 297/328
[58] Field of Search ...................... 248/371, 371.2, 393, 248/394, 395, 396, 397, 398, 429; 297/328, 330, 326, 327, 329

[56] References Cited

U.S. PATENT DOCUMENTS

| | | | |
|---|---|---|---|
| 2,729,273 | 1/1956 | Hamilton et al. | 297/326 X |
| 2,930,428 | 3/1960 | De Rose | 297/330 X |
| 3,460,793 | 8/1969 | Posh | 248/394 |
| 3,552,707 | 1/1971 | Tanaka | 248/396 X |
| 3,692,271 | 9/1972 | Homier | 248/396 X |
| 4,095,770 | 6/1978 | Long | 248/371 |
| 4,247,071 | 1/1981 | Carella | 248/396 |
| 4,285,487 | 8/1981 | Kazaoka | 248/394 X |

Primary Examiner—J. Franklin Foss
Attorney, Agent, or Firm—James B. Raden; Edward J. Brosius

[57] ABSTRACT

A vehicle seat adjusting apparatus for adjusting the angle of inclination of a seat and thereby adjusting passenger height and available leg room by rotating the seat about a single, centrally located, transverse or lateral axis. A latch mechanism normally holds the seat relative to the seat track rails. Release of the latch mechanism is effected through a manual lever at the outside of one seat rail. The lever draws a release assembly laterally of the seat to slide a release arm longitudinally of the seat. The seat may then be notched to a desired position with the aid of a bias spring assisting the seat movement. Release of the lever allows the latch mechanism bias to restore the latch action in the desired position. By using a central pivot, you adjust the attitude of the seat and, by virture of the motion pattern, the rear of the seat moves up or down thus raising or lowering the occupants eye level in the vehicle. By tilting the seat backward, a tall person can get comfortable and increase his or her leg and head room. By tilting the seat forward, a short person can be comfortable, be closer to the foot pedals, and raise their eye level for better vision.

3 Claims, 4 Drawing Figures

ADJUSTABLE VEHICLE SEAT MECHANISM

BACKGROUND OF THE INVENTION

Adjusting devices for vehicle seat mechanisms are, of course, well known in the art. Such adjustments include fore and aft adjustments and seat height adjustments. In seat height adjustments, the usual approach is to allow separate adjustment of the height and front end of the seat and of the height of the rear end of the seat. For example, U.S. Pat. No. 3,460,793 issued Aug. 12, 1969 shows one such apparatus. In such devices, torsion springs are used to bias the seat toward the terminal positions for each end of the seat.

In such devices, levers having a toothed or notched vertical face mate with releasable latch bars to position either the latch bars or the levers and hold the seat in the position into which it is set.

SUMMARY OF THE INVENTION

The present invention is directed to apparatus for varying the angle of inclination of a vehicle seat about a single transverse axis midway along the seat length. The apparatus may preferably be part of a seat track mechanism in which horizontal movement of the seat relative to the seat track is allowed, the horizontal moving assembly not forming a part of the present invention.

The apparatus shown herein has a central transverse shaft axis about which the seat is pivotal to vary the angle of inclination of the seat between terminal limiting positions. With the inclination pivotal about the centralized axis, the seat can be adjusted for passenger height and to provide desired leg room. To hold the seat in a position to which set, the apparatus has at least one latch plate, displaced in a vertical plane with a plurality of vertically spaced notches in one end of the plate. The plate is secured to the seat and seat support structure and mates through one of its notches with a pin or stationary latching detent member secured to the side rail structure of the track mechanism. The mating of the plate notch and the latching detent member hold the seat and seat support in the position to which set. A tension spring holds the latching plate in the latched condition to keep the seat at the angle of inclination to which set.

A release assembly is provided under the control of a manual lever pivoted outside one seat rail. In a preferred form, the lever may be pivotally secured to the transverse pivot shaft for the seat. A cable assembly is used to couple the latch plate to the manual release lever a distance from the lever pivot. The cable assembly responds to pivotal outward movement of the lever to move laterally and draw the latch plate longitudinally against the tension of the bias spring. Movement of the latch plate frees it from its mating with the latch detent and allows the seat angle of inclination to be changed and set at a desired angle. When the desired angle is reached, the manual lever is released and the tension of the spring restores the latch to allow the detent to enter the plate notch at the set seat position and inclination angle.

In the specific embodiment shown, two latch plates are employed. Each has a notched face to mate with the rail detents. The latch plates are moved simultaneously out of the latched condition by ends of a cable, the intermediate portion of which is joined to the lever cable at a floating pulley. The two latch plates form a more stable assembly than the use of a single latch plate.

DETAILED DESCRIPTION

Figure 1:
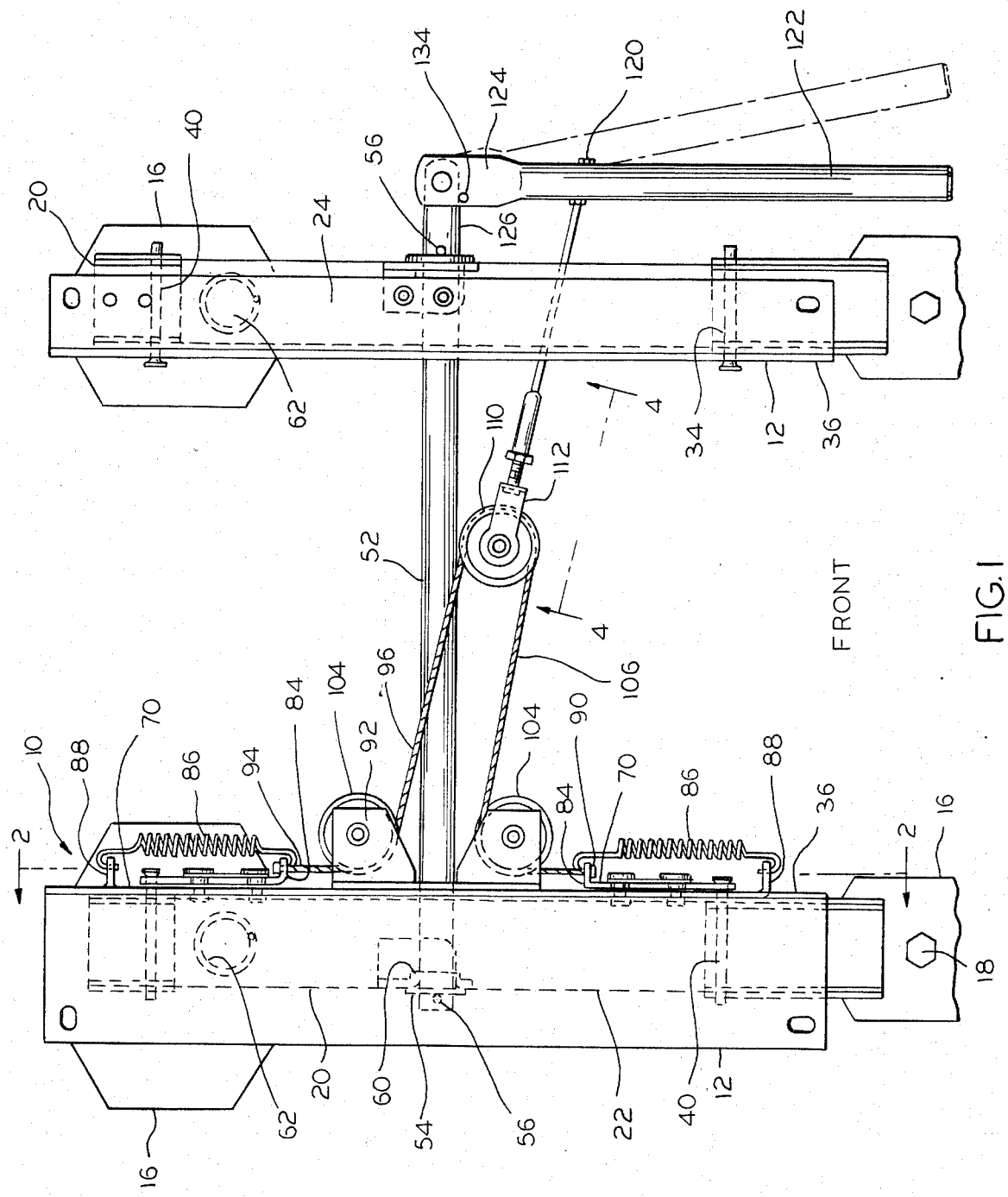
FIG. 1 is a plan view of the apparatus of the present invention with the seat removed.

In FIG. 1, I show a manual seat track mechanism 10, which may have a horizontal fore and aft movement of any known type. No horizontal movement components have been shown herein, as being outside the scope of the present invention.

In FIG. 1, there is shown a pair of spaced apart seat rails 12 which form the lateral extremities of a bucket seat (not shown) of a vehicle or a split bench seat (not shown) of a vehicle. Each seat rail 12 includes a stationary base rail 14 affixed front and back to the vehicle floor 16 by suitable bolts 18. Tracked to the base rails by conventional means such as the tracking shown for the power seat track of U.S. Pat. No. 4,015,812 issued Apr. 5, 1977 to M. Heesch are the respective slide rails 20, a left slide rail 22 and right slide rail 24.

The slide rails are unitary beams, generally formed by two L leg sections 26 with the base of each L leg facing inwardly and with a horizontal top wall 28 joining the tops of the L sections. The horizontal top wall 28 extends only for a short distance at the front and back of the rail while the L section sides and base of the L continue for the full length of the rail to provide slide capability on the stationary base rails.

The slide rails 20 have aligned pads 30 raised above the top wall 28 at the sides of the rails for mating relationship with a vertical bracket section 34 of the seat support member 36. The pads 30 are raised sheet steel structural flanges 32 upstanding from the slide rails 20 on each side of each rail. The pads 30 serve as mounts for latch rods 40, there being a latch rod 40 adjacent the front and back of each slide rail as seen best in FIG. 1. The latch rods 40 mount horizontally through aligned openings in the flanges of opposed sides of the slide rails. The rods may be suitably headed at the ends to prevent axial movement of the rods while allowing rotational movement within the flange openings.

The latch rods 40 extend through arcuate slots 42 in the brackets 34 to mate the seat support members to the slide rails at a fixed height above the slide rails, with one such rod at each end of each rail.

Figure 2:
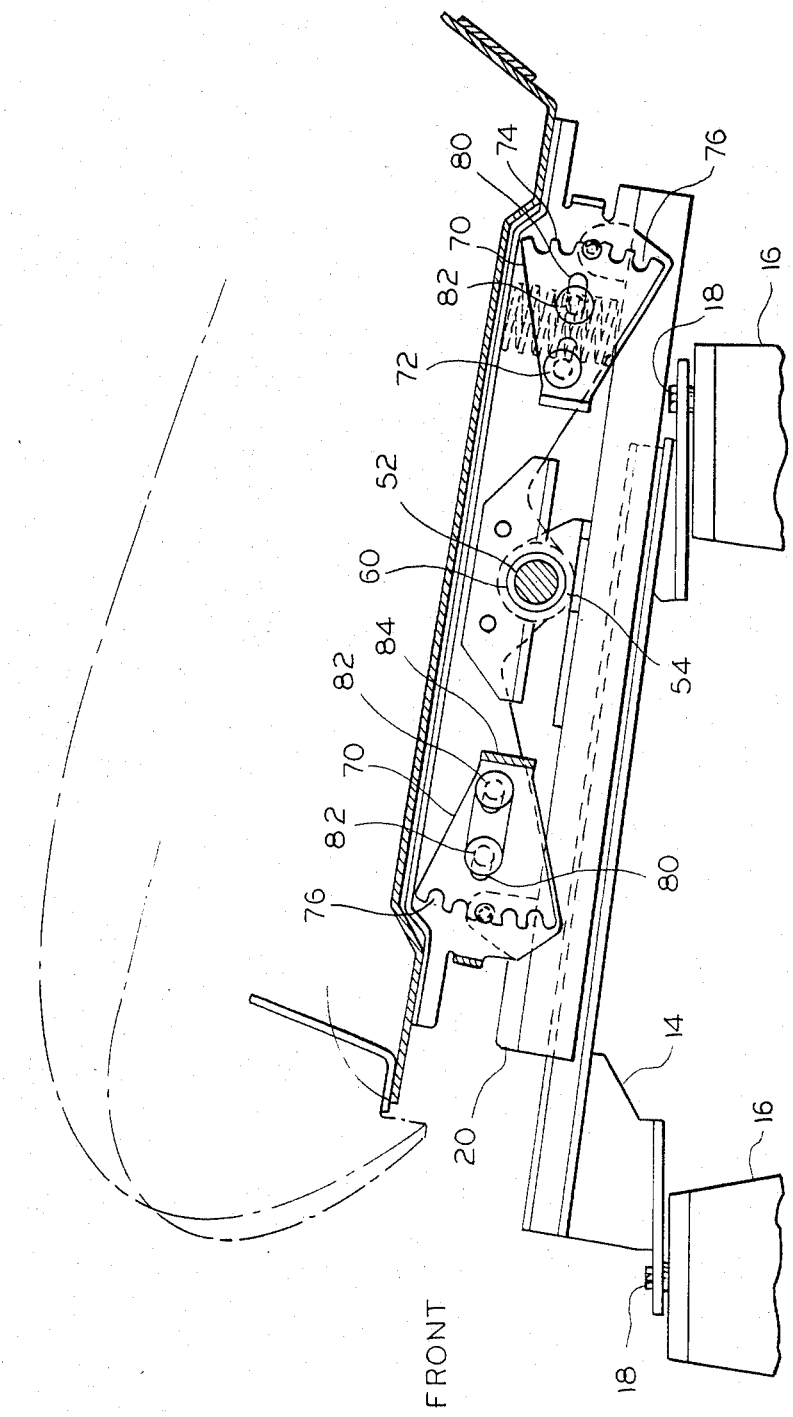
FIG. 2 is a sectional view taken along line 2—2 of FIG. 1.

The seat members 36 are essentially inverted L shaped structural strength members for receiving and bearing thereon a conventional vehicle seat shown only in FIG. 2 by the dashed line showing indicated by the number 50. The seat support members 36, a right and a left one, provide essentially horizontal top beams on which a seat pan 51 or other seat structure not shown can be rested and secured by conventional means and for mounting the seat on the side rails, as will be explained.

At the longitudinal midpoint of the slide rails 20, the rails bear a generally horizontal transverse shaft 52 within bearings 54 mounted on and secured above the top of the slide rails. The bearings 54 are borne by supports 56 secured to the top wall 28 of the slide rails to firmly mount the shaft on the slide rails. The side brackets 34 of the seat support members have openings 60 sized to receive the shaft. Within these openings 60, the shaft is secured to the seat support brackets 34 to render both seat support members pivotal with the shaft relative to the slide rails thereby to allow adjustment of the angle of inclination of the seat relative to the seat rails. The shaft 52 has pins 56 set in it outside the outer side rails to prevent axial slide movement of the shaft.

Resting on the base rail 14 near the rear end of each seat track is a compression spring 62. The base 64 of each compression spring bottoms against the base rail while the top 66 of the spring rests against the underside of top wall of the seat support member 36. Thus, the springs bias the rear of the seat upwardly and must be acted against by pressure of the body of the seat occupant to change the angle of inclination of the seat.

To provide control of the angle of inclination of the seat, two latch or lock plates 70 are mounted on the seat support bracket on the right side of the left seat rail. The plates are identical in shape and configuration and are both pinned to the adjacent bracket 34 in a lost motion connection. The plates 70 are generally trapezoidal or pie shaped with the narrow ends 72 confronting one another and the larger ends 74 remote from one another. The larger end of each plate has an alignment of notches 76, five such notches 76 being shown in each plate 70. A selected notch receives the latch rod to prevent pivotal movement of the seat about the pivot shaft, the latch rod acting as a latch detent in conjunction with a selected notch.

Each plate 70 has a pair of aligned generally horizontally enlarged slots 80 through which the plate is pinned to the adjacent seat support bracket by rivets or headed pins 82 or the like to enable limited horizontal movement of the plates relative to the seat support brackets, due to the lost motion connection.

At its narrow end 72, the end closest to the pivot shaft, each plate 70 has a lateral flange 84 with two openings. The first of these openings is sized to receive one tang end of a tension spring 86. The seat support bracket 34 adjacent the plates has a flange 88 with opening to receive the other end of the tension spring, as seen best in FIG. 1.

The second opening 90 in the flange 84 of the latch plate receives one end 94 of a wire cable 96 or flexible wire rope to enable movement of the plates toward one another against the bias imposed by the tension springs 86.

Each cable extends around a stationary pulley 102 mounted on an extension ledge 104 of the seat support bracket on each side of the pivot shaft 52. The cable 94 passes around the outside of the stationary pulleys 102 and its intermediate section 106 passes about a third pulley. The rotational axis of the third pulley 110 is pinned to the legs of a clevis 112. The base of the clevis is connected to a threaded stud 114 in a lock nut assembly at one end of a rod 116. The rod 116 is affixed at its other end to an intermediate point 120 on a manual handle 122 to enable the third pulley to float under the control of the handle 122. The threaded stud and nut arrangement enables the maintenance of cable tension to accommodate for manufacturing tolerances and cable stretching.

The handle 122 is secured at one end 124 to the outer end 126 of the pivot shaft outside the right seat rail. The shaft being tubular is flattened at its mounting end 124 outside the rail 12 and the flattened end 130 of the tubular handle is secured by a suitable headed pivot pin 132 or similar attachment means to the shaft.

The handle 122 extends forwardly from the shaft and ends approximately adjacent the front of the seat assembly. As mentioned previously, the rod 116 is secured to the handle 122 a lever arm distance from the handle, mounting in the direction of the forward end of the seat. The securement of the rod 116 to the handle 122 may be by any suitable means, the means shown being the extension of the rod through grommeted openings in the handle walls with suitable clamping or heading of the rod on the outer side of the handle.

The third pulley 110 therefore is movable generally laterally at a forward angle when the handle 122 is moved outwardly. The movement of the third pulley 110 draws both ends of the cable 96 taut and extends the tension springs 86 to slide the latch plates 70 toward one another. The movement of the plates 70 release the mating of the plates 70 the seat support 36 to which they are mounted from the seat rails 12 by moving the notches 76 out of engagement with the latch rods 40.

With the latch engagement released, the seat may be pivoted as a unit on the shaft axis by body movement of the seat occupant combined with like movement of handle 122 to a desired angle of seat inclination. At that level, the handle 122 is released and moves inwardly toward the rail under the effect of the tension springs 86 until latch plates 70 bottom out on the latch pins. The stop pin 134 on the release handle 122 engages the pivot shaft 52 to prevent rattling of the release handle with the mechanism in the adjusted position. The plates 70 restore and the notches 76 at the set level engage the respective latch rods 40 to latch the seat at the desired or set angle of inclination.

As can be seen, notched latch plates 70 are provided front and rear along one side of one rail to mate with the latch rods 40. At the remaining sides of the slide rails, the latch rods ride freely within arcuate slots of the seat support bracket.

Figure 4:
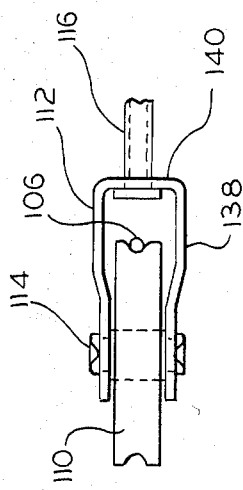
FIG. 4 is a view in elevation of the cable assembly viewed at line 4—4 of FIG. 1.
Figure 3:
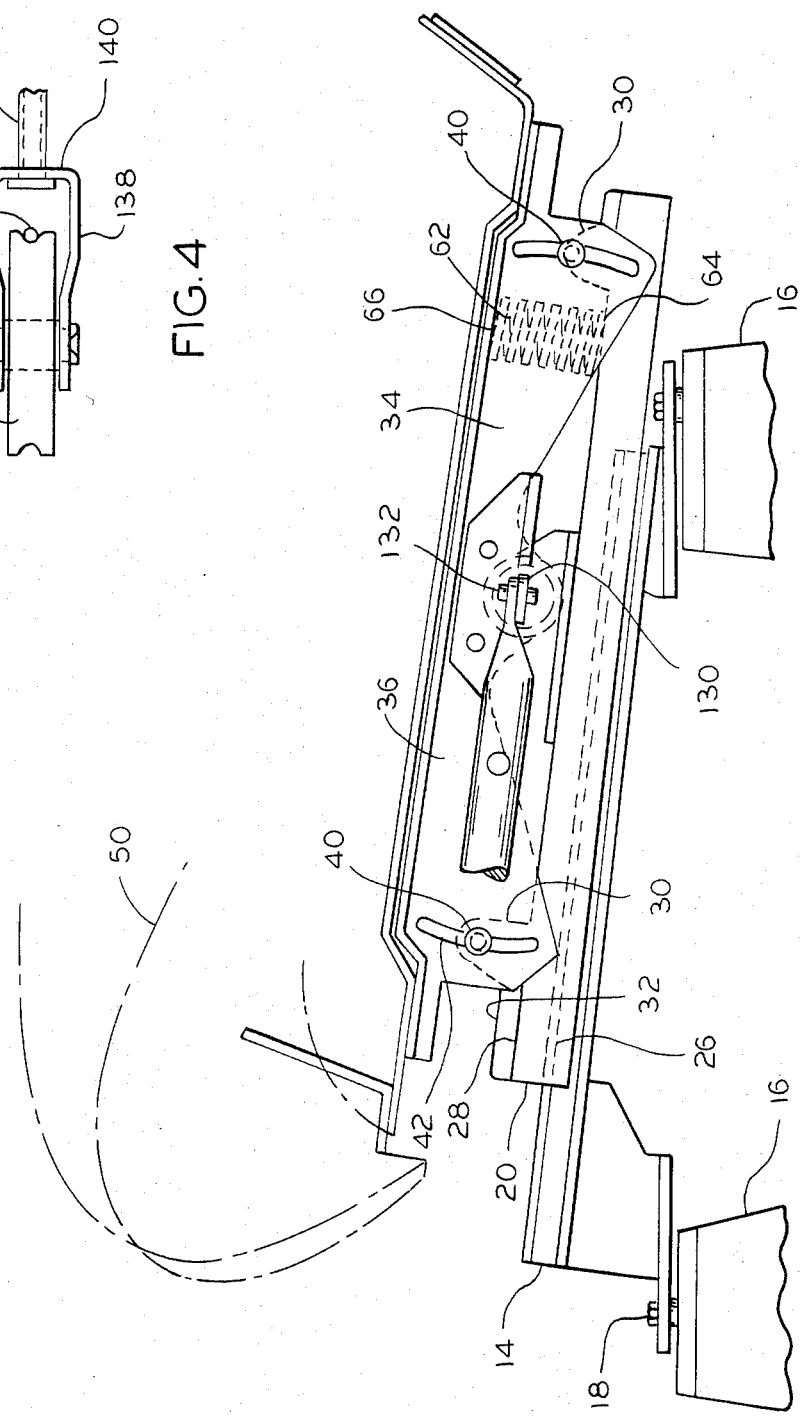
FIG. 3 is a right side view in elevation of the apparatus of FIG. 1.

In FIG. 4, I show one method of mounting the third pulley 110 to the end of cable 116 through the use of a clevis 112 with its legs 138 secured to the rotational axis of the pulley 110 and the base 140 of the clevis secured to the end of cable 116 by an enlarged head of the cable inward of the clevis base.

With the construction shown, each latch plate has five notches thereby providing five possible seat positions, each at a different angle of inclination of the seat, thereby providing five different heights for the rear of the seat. To provide more possible position, the latch plates shown could be replaced by plates having the desired number of notches, one notch per position.

What is claimed is:

1. A vehicle seat track assembly adapated to mount thereon a vehicle seat structure enabling limited pivotal movement of said seat about an intermediate lateral pivot axis, said assembly including a first side rail at one lateral end of said seat and a second side rail at the other lateral end of the seat, bearing structure on each side rail for mounting a pivot shaft for pivotal movement about said pivot axis, said bearing structure including non-pivotal beam members supported on each side rail and seat support structure mounting on said shaft for pivotal movement with said shaft relative to said beam members, latch structure for preventing pivotal movement of said seat support structure, said latch structure in a normal position engaging said support structure to said one side rail to prevent movement thereof, means for releasing said engagement comprising an arm selectively laterally displaceable responsive to manually initiated movement, a manually operable handle mounted externally of the other side rail at its end pivotally on an extension of said shaft, said handle also being secured to said laterally displaceable arm to displace said arm on pivoting of said handle about its end, and a longitudinally translatable plate secured to said arm in a manner such that the lateral displacement of said arm is converted into longitudinal slide movement of said translatable plate, said plate including a plurality of spaced notches at one longitudinal end thereof for mating in the notches thereof a generally horizontal, stationary rod secured to said one slide rail, to lock said seat from movement about said pivot axis.

2. Apparatus for adjusting the angle of inclination of a vehicle seat relative to side rails of a seat track, said seat being adjustable about a single axis of adjustment of said seat intermediate along the seat length, said apparatus comprising a lateral shaft pivotal about the axis of adjustment, said side rails bearing said shaft at the lateral shaft ends, seat supporting members mounted on said shaft for pivotal movement thereabout to change the height of the front end of said seat, latching members interposed between at least one side rail and said seat support members to latch the seat in one of a plurality of angular positions about the shaft axis, said latching members including a first and a second latch plate secured to said seat support members, means constraining said latch plate to longitudinal slide movement of limited extent, latch detents secured to said one side rail and engaging said latch plates to hold said plates in one angular position, latch release structure for slideably drawing said latch plates toward one another against normal bias applied to said latch plates, a release assembly coupled to the latch plates to slideably draw said latch plates in a release direction against said normal bias to release the engagement of the plates to said latch detents to enable manual adjustment of the seat about the pivot axis to one of said seat positions, a compression spring interposed between said one side rail and the seat supporting member borne thereon to bias said member away from said rail toward the maximum angle of inclination, said latch plates being longitudinally spaced apart and each plate having an alignment of vertically spaced notches in the end thereof remote from the other plate for engaging said detents, said detents comprising laterally mounted rod members secured to said one side rail, and a release lever arm pivotably supported on said pivot shaft externally of the other of said side rails, with said release assembly extending from a coupling to both said latch plates to a connection to said lever arm with the connection to the lever arm spaced from the pivotal support of the lever arm to cause movement of said plates on movement of said lever arm.

3. Apparatus as claimed in claim 2, in which said release assembly includes a first cable with the ends thereof secured to the respective latch plates, and in which there is a further cable connected to the lever arm and to a member holding said first cable tautly.

* * * * *